United States Patent [19]

Lauterbach

[11] Patent Number: 4,689,375
[45] Date of Patent: Aug. 25, 1987

[54] CURABLE MIXTURES CONTAINING DIETHYLPHENYL BIGUANIDE AND THE USE THEREOF

[75] Inventor: Horst Lauterbach, Therwil, Switzerland

[73] Assignee: Ciba-Geigy Corporation, Ardsley, N.Y.

[21] Appl. No.: 777,901

[22] Filed: Sep. 19, 1985

[30] Foreign Application Priority Data

Sep. 27, 1984 [CH] Switzerland ............ 4629/84
Jun. 26, 1985 [CH] Switzerland ............ 2709/85

[51] Int. Cl.$^4$ .................. C08G 59/50; C08L 63/00
[52] U.S. Cl. .................. 525/471; 525/504; 525/524; 528/123; 528/93
[58] Field of Search ............ 528/123, 94, 93, 91, 528/361, 407; 525/471, 472, 504, 524

[56] References Cited

U.S. PATENT DOCUMENTS

| | | | |
|---|---|---|---|
| 3,308,094 | 3/1967 | Sherr | 528/123 X |
| 3,631,149 | 12/1971 | Gempeler et al. | 528/123 |
| 3,732,286 | 5/1973 | Son et al. | 528/123 X |
| 3,795,657 | 3/1974 | Howsam et al. | 528/123 |
| 4,403,078 | 9/1983 | McCoy et al. | 528/123 X |

OTHER PUBLICATIONS

Kirk—Othmer, "Encylopedia Polymer Science and Technology", vol. 11, Wiley New York, 1969, pp. 273-279.
Ullmanns "Encyklopaedie der Tech. Chemie", vol. 12, Verlag, Weinheim, 1976, pp. 547-555, (English translation).
K. J. Saunders, "Organic Polymer Chemistry", Chapman & Hall, London, 1973, pp. 370, 386 and 392.

*Primary Examiner*—Earl Nielsen
*Attorney, Agent, or Firm*—Luther A. R. Hall

[57] ABSTRACT

The invention relates to curable mixtures comprising
 (a) at least one epoxy resin containing on average more than one epoxy group in the molecule,
 (b) at least one diethylphenyl-biguanide of formula I

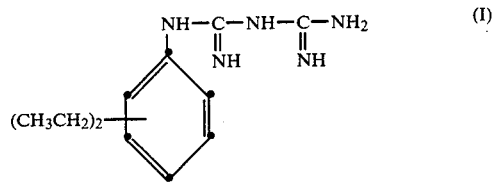

or a combination of a biguanide of formula I and a ketone resin, a ketone/formaledhyde resin or a phenoxy resin, as curing agent, and
 (c) optionally a curing accelerator.

These mixtures are suitable for example as casting resins, laminating resins and, in particular, as powder coating compositions.

11 Claims, No Drawings

CURABLE MIXTURES CONTAINING DIETHYLPHENYL BIGUANIDE AND THE USE THEREOF

The present invention relates to curable mixtures containing diethylphenyl biguanide and the use thereof for the preparation of cured products.

It is known that biguanide and biguanide derivatives are suitable curing agents for curable mixtures containing epoxy resins. For example, U.S. Pat. No. 3,631,149 discloses 2,6-xylenyl biguanide as curing agent for epoxy resins. However, there is still a need for highly reactive curing agents with improved properties.

Specifically, the present invention relates to novel curable mixtures containing
(a) at least one epoxy resin having on average more than one epoxy group in the molecule,
(b) at least one diethylphenyl biguanide of formula I

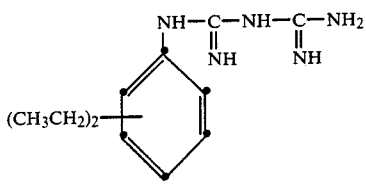

as curing agent, and
(c) optionally a curing accelerator.

Component (b) is preferably 2,6-diethylphenyl biguanide.

To improve the shelf life of the curable mixtures, the diethylphenyl biguanide can be used together with a substance, as curing agent (b), which substance is essentially chemically inert to the diethylphenyl biguanide and to the epoxy resin (a).

Suitable chemically inert substances are, in particular, ketone resins, ketone/formaldehyde resins or phenoxy resins, preferably those which, in combination with the biguanides of formula I, have a mixture softening point that is higher than the softening point of the biguanides of formula I.

Ketone resins and ketone/formaldehyde resins can be prepared by alkaline condensation of suitable ketones such as cyclohexanone and methyl cyclohexanone, or from formaldehyde and ketones such as acetophenone and naphthalene methyl ketone. Phenoxy resins are thermoplastic polyether resins synthesised from bisphenol and epichlorohydrin and which do not contain epoxy groups and have a substantially higher molecular weight compared with epoxy resins.

Preferred curable mixtures of this invention are therefore those in which component (b) is a combination of a biguanide of formula I and a ketone resin, ketone/formaldehyde resin or phenoxy resin, in particular a ketone/formaldehyde resin.

The weight ratio of biguanide of formula I to the ketone resin, ketone/formaldehyde resin or phenoxy resin is in general 40-90:6-10, preferably 50-65:50-35.

Representative examples of epoxy resins containing on average more than one epoxy group in the molecule and which are employed as component (a) in the curable mixtures of this invention are in particular: alicyclic polyepoxides such as vinylcyclohexene diepoxide, limonene diepoxide, dicyclopentadiene diepoxide, bis(2,3-epoxycyclopentyl)ether, bis(3,4-epoxycyclohexylmethyl)adipate, (3',4'-epoxycyclohexylmethyl)-3,4-epoxycyclohexanecarboxylate, 3-(glycidyloxyethoxyethyl)-2,4-dioxaspiro-(5.5)-8,9-epoxyundecane;

di- or polyglycidyl ethers of polyhydric aliphatic alcohols such as 1,4-butanediol, or polyalkylene glycols such as polypropylene glycols; di- or polyglycidyl ethers of cycloaliphatic polyols such as 2,2-bis(4-hydroxycyclohexyl)propane;

di- or polyglycidyl ethers of polyhydric phenols such as resorcinol, bis(4-hydroxyphenyl)methane (bisphenol F), 2,2-bis(4-hydroxyphenyl)-propane (bisphenol A) or 2,2-bis(3,5-dibromo-4-hydroxyphenyl)propane (tetrabromo-bisphenol A);

polyepoxides derived from novolaks, in particular phenol/formaldehyde- or cresol/formaldehyde novolaks;

polyglycidyl esters of polyvalent carboxylic acids such as phthalic acid, terephthalic acid or hexahydrophthalic acid;

N-glycidyl derivatives of amines, amides and heterocyclic nitrogen bases such as N,N-diglycidyl aniline, N,N-diglycidyl toluidine, triglycidyl isocyanurate or N,N,N',N'-tetraglycidyl bis(p-aminophenyl)methane.

Mixtures of different epoxy resins can also be used. The epoxy resins may be solid or liquid but are preferably solid. The epoxide equivalent weight of the epoxy resins is conveniently in the range from 150 g/equivalent to 2500 g/equivalent, preferably from 500 to 2000 g/equivalent.

Preferred epoxy resins are those based on novolaks or polyhydric phenols, with those based on dihydric phenols being especially preferred. The most preferred epoxy resins are those based on bisphenol A.

As component (c) it is possible to use known curing accelerators of the so-called amine type. Typical examples are: unsubstituted imidazole and imidazole derivatives, for example 1-methylimidazole, 2-ethyl-4-methylimidazole, 2-phenylimidazole, 4,5-diphenylimidazole or benzimidazole; N-acylimidazoles such as 1-(2,4,6-trimethylbenzoyl)-2-phenylimidazole, 1-(2,6-dichlorobenzoyl)-2-methylimidazole, or 1-(2-chloro-6-nitrobenzoyl)-2-phenylimidazole; pyridine and pyridine derivatives such as 4-aminopyridine; tertiary amines such as benzyl dimethylamine or 2,4,6-tris(dimethylaminomethyl)phenol; urea derivatives such as N-(p-chlorophenyl)-N',N'-dimethylurea (Monuron), N-phenyl-N',N'-dimethylurea, bis(dimethylureido)toluene or N,N'-bis(phenylcarbamoyl)piperazine; boron trichloride and boron trifluoride complexes with tertiary amines, for example with trimethylamine or N-benzyldimethylamine; guanidine and derivatives thereof, such as tetramethyl guanidine; or acyl derivatives such as acetyl guanidine or butyryl guanidine; or quaternary ammonium salts such as choline chloride; or an alkyltrimethylammonium bromide commercially available under the registered trademark Morpan® (ABM Chemical Ltd).

Preferred curing accelerators are imidazole and derivatives thereof and, in particular, tetramethylguanidine and, most preferably, choline chloride.

Mixtures with choline chloride as a curing accelerator are particularly stable during storage.

The curing accelerators are preferably employed in an amount of 0.1 to 5 parts by weight, based on 100 parts by weight of epoxy resin.

Preferred curable mixtures are those containing an epoxy resin based on polyhydric phenols, in particular bisphenol A as component (a), a combination of a biguanide of formula I, in particular 2,6-diethylphenyl biguanide, and a ketone/formaldehyde resin, as component (b), and imidazole or, in particular, tetramethylguanidine, but most preferably choline chloride, as component (c).

The curable mixtures of this invention conveniently contain 3 to 20 parts by weight, preferably 5 to 10 percent by weight, of component (b), per 100 parts of epoxy resin.

The biguanides of formula I can be prepared in a manner known per se, for example by a process analogous to that described in U.S. Pat. No. 3,631,149, by reacting a diethyl-substituted aniline with dicyandiamide.

If a combination of a biguanide of formula I and a ketone resin, a ketone/formaldehyde resin or a phenoxy resin is used as a component (b), then both components are preferably fused together and the melt is granulated.

All starting compounds and further substances employed in the mixture of this invention can be prepared by known methods or are commercially available.

The mixtures of the present invention have high reactivity in conjunction with good flow properties. This is surprising, as in general an increased reactivity impairs the flow properties of curable mixtures based on epoxy resins and curing agents of the biguanidine type. For example, when used as powder coating compositions known biguanides give coatings with an irregular surface, as a result of which the gloss suffers.

The curing of the curable mixtures of this invention is conveniently effected in the temperature range from 120° to 220° C., preferably from 140° to 200° C.

The term "curing" as employed throughout this specification denotes the conversion of the soluble, either liquid or fusible, epoxy resins into solid insoluble and infusible three-dimensional crosslinked products or moulding materials, usually with concomitant shaping to moulded articles such as lacquer films, castings, laminates and the like.

The preparation of the curable mixtures of this invention can be effected in conventional manner with the aid of known mixers (stirrer, kneaders, rolls or, if solid substances or powders are employed, in mills or dry mixers). It is sometimes necessary to heat the mixture briefly so as to obtain a sufficient degree of homogeneity.

Customary modifiers such as extenders, fillers and reinforcing agents, pigments, dyes, organic solvents, plasticisers, flow control agents, thixotropic agents, flame retardants, mould release agents, can also be added to the curable mixtures of the present invention.

Typical examples of extenders, reinforcing agents, fillers and pigments are: coal tar, bitumen, textile fibres, glass fibres, asbestos fibres, boron fibres, carbon fibres, cellulose, polyethylene powders and quartz powder; mineral silicates such as mica, asbestos powder or slate powder; kaolin, aluminium oxide trihydrate, chalk powder, gypsum, antimony trioxide, bentones, silica aerogel ("AEROSIL"), lithopones, barytes, titanium dioxide, carbon black, graphite, oxide colours, such as iron oxide, or metal powders such as aluminium powder.

Examples of organic solvents suitable for modifying the curable mixtures are toluene, xylene, n-propanol, butyl acetate, acetone, methyl ethyl ketone, diacetone alcohol, ethylene glycol monomethyl ether, ethylene glycol monoethyl ether and ethylene glycol monobutyl ether.

Examples of suitable plasticisers are dibutyl phthalate, dioctyl phthalate and dinonyl phthalate, tricresyl phosphate or polypropylene glycols.

Examples of flow control agents which can be added when the curable mixtures are used in particular in surface protection are benzoin, silicones, cellulose acetobutyrate, polyvinylbutyrate, acrylic copolymers, waxes or stearates, some of which are also used as mould release agents.

Particularly for use in the coating sector, the polyepoxide compounds can furthermore be partially esterified in known manner with carboxylic acids, in particular with higher unsaturated fatty acids. It is also possible to add other curable synthetic resins, for example phenoplasts or aminoplasts, to such surface-coating resin formulations.

The curable mixtures of this invention are used, in particular, in the fields of surface protection, electrical engineering, laminating processes and adhesives technology and in the building trade. They can be used in a formulation suited in each case to the particular application, in the unfilled or filled state, if desired in the form of solutions or emulsions, as moulding compositions, whirl sintering powders, casting resins, injection moulding compositions, impregnating resins and adhesives and as tooling resins, laminating resins and, preferably, as powder coating compositions.

EXAMPLE A: Preparation of component (b)

56.8 g of 2,6-diethylphenyl biguanide (softening point: 72° C.) and 40.0 g of "Kunstharz SK" ® (a ketone/formaldehyde resin available from Hüls; softening point: 134° C.) are fused together at 140° C. The melt is granulated after it has solidified in a flat pan (softening point: 120° C.; granular size: ca. 2 mm).

EXAMPLE 1

The following components are homogenised conjointly at 80° C. in an extruder (Buss Ko-kneader):
601 g of a resin mixture based on bisphenol A and modified with a fatty acid (epoxide equivalent weight: 900 g/equivalent; softening point according to DIN 51 920: 93° C.),
35 g of the curing component (b) of Example A,
1.3 g of benzoin, and
318 g of titanium dioxide.

Upon cooling, the mixture is comminuted in an impact mill to an average particle size of 40 μm (micrometer).

The powder coating composition so obtained is sprayed electrostatically onto an aluminium sheet, which is stoved for 10 min at 170° C. The resultant film has a thickness of 60–70 μm, and its properties are summarised in the Table.

EXAMPLE 2

The procedure of Example 1 is repeated, except that 1.3 g of tetramethylguanidine are added to the mixture. Stoving is carried out for 10° C. at 155° C. Despite the markedly higher reactivity of the mixture employed, the resultant lacquer film, as is evident from the Table, has flow properties comparable to those of the film obtained in Example 1.

EXAMPLE 3

The following components are mixed and processed to a powder coating composition as described in Example 1:

990 g of an epoxy resin based on bisphenol A (epoxide value: 1.3 equivalent/kg; softening point according to DIN 51920: 98° C.), 10 g of a flow control agent based on an acrylic copolymer (Acronal ® 4F, available from Bayer), 90 g of curing component (b) of Example A, 10 g of choline chloride, 2 g of benzoin, and 551 g of TiO$_2$.

This powder coating composition is sprayed onto an aluminium sheet and stoved as described in Example 1. The properties of the film so obtained are reported in the Table.

The values obtained in the following tests are reported in the Table:

1. Flow:

According to DIN 53 230. Denotes a visual assessment of the surface. Using a reference scale, an assessment is made of the extent to which the surface deviates from the ideal gloss and exhibits a structure similar to orange skin. This assessment can be made by using the terms "excellent", "very good", "good", "fair", "poor" and "very poor". The ideal state of "excellent" is almost never achieved.

2. Erichsen impact test:

A 1 kg bolt is dropped at an energy of 1.60 kg.m onto the back of a varnish-coated plate to form a dent. The test is designated as "passed" if, despite the dent, the coating remains quite intact, and as "not passed" if the coating suffers even only the slightest damage.

3. Yellowness:

According to DIN 6167. The yellowness value is an indication of the heat stability of the varnish coating. As in the flow test, the value has no unit.

4. Minimum stoving temperature (°C.):

According to DIN 55 990. It is an important reference value for the reactivity of the resin/curing agent mixture.

TABLE

| Example | Flow | Impact test | Yellowness | Minimum stoving temperature (°C.)* |
|---|---|---|---|---|
| 1 | very good to excellent | passed | 1 | 170 |
| 2 | very good to excellent | passed | 4.5 | 155 |
| 3 | very good to excellent | passed | 3 | 165 |

*at a stoving time of 10 min.

Comparably good results are obtained by using 1.1 g of imidazole instead of 1.3 g of tetramethylguanidine in Example 2.

What is claimed is:

1. A curable mixture comprising
   (a) at least one epoxy resin containing on average more than one epoxy group in the molecule, and
   (b) an effective amount of a combination of 2,6-diethylphenyl biguanide and a ketone resin, a ketone/formaldehyde resin or a phenoxy resin as curing agent.

2. A mixture according to claim 1 wherein component (b) is a combination of 2,6-diethylphenyl biguanide and a ketone/formaldehyde resin.

3. A mixture according to claim 1 which additionally contains as components (c) an effective amount of a curing accelerator.

4. A mixture according to claim 1, wherein component (a) is an epoxy resin based on bisphenol A.

5. A mixture according to claim 3, wherein component (c) is imidazole, a derivative thereof or tetramethylguanidine.

6. A mixture according to claim 5, wherein component (c) is imidazole or tetramethylguanidine.

7. A mixture according to claim 3, wherein component (a) is an epoxy resin based on bisphenol A, component (b) is a combination of 2,6-diethylphenyl biguanide and a ketone/formaldehyde resin and component (c) is imidazole or tetramethylguanidine.

8. A mixture according to claim 3, wherein component (c) is a quaternary ammonium salt.

9. A mixture according to claim 8, wherein component (c) is choline chloride.

10. A method for the production of cured products which comprises heating a curable mixture according to claim 1.

11. A moulding compound, whirl sintering powder, casting resin, injection moulding composition, impregnating resin, adhesive, tooling resin, laminating resin or powder coating composition comprising a curable mixture according to claim 1.

* * * * *